US012080957B2

(12) United States Patent
Shibata et al.

(10) Patent No.: US 12,080,957 B2
(45) Date of Patent: *Sep. 3, 2024

(54) DUAL BAND PATCH ANTENNA

(71) Applicant: TDK Corporation, Tokyo (JP)

(72) Inventors: Tetsuya Shibata, Tokyo (JP); Naoki Sotoma, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,550

(22) Filed: Jan. 27, 2023

(65) Prior Publication Data

US 2023/0178892 A1 Jun. 8, 2023

Related U.S. Application Data

(63) Continuation of application No. 17/477,999, filed on Sep. 17, 2021, now Pat. No. 11,594,817, which is a continuation of application No. 16/191,060, filed on Nov. 14, 2018, now Pat. No. 11,329,379.

(30) Foreign Application Priority Data

Nov. 17, 2017 (JP) ................................ 2017-221423

(51) Int. Cl.
*H01Q 5/307* (2015.01)
*H01Q 9/04* (2006.01)

(52) U.S. Cl.
CPC .......... *H01Q 5/307* (2015.01); *H01Q 9/0407* (2013.01)

(58) Field of Classification Search
CPC ......... H01Q 1/38; H01Q 5/307; H01Q 9/0407
See application file for complete search history.

(56) References Cited

U.S. PATENT DOCUMENTS

2007/0279286 A1* 12/2007 Coutts ................. H01Q 9/0442 343/700 MS
2012/0268347 A1* 10/2012 Tatarnikov .......... H01Q 13/106 343/893
2017/0244163 A1* 8/2017 Yoo ...................... H01Q 9/0442

* cited by examiner

*Primary Examiner* — David E Lotter
(74) *Attorney, Agent, or Firm* — YOUNG LAW FIRM, P.C.

(57) ABSTRACT

Disclosed herein is a dual band patch antenna that includes a first feeding part, first and second radiation conductors, a first feeding conductor having one end connected to the first feeding part and other end connected to the first radiation conductor, a second feeding conductor having one end connected to the first feeding part and other end connected to the second radiation conductor, a first open stub having one end connected to the first feeding conductor and other end opened, and a second open stub having one end connected to the second feeding conductor and other end opened.

13 Claims, 12 Drawing Sheets

DUAL BAND PATCH ANTENNA

BACKGROUND OF THE INVENTION

Field of the Invention

The present invention relates to a dual band patch antenna capable of performing communication in two frequency bands.

Description of Related Art

JP 2015-502723 A, JP 2007-060609 A, and JP 2002-299948 A each disclose a dual band patch antenna capable of performing communication in two frequency bands. For example, JP 2015-502723 A discloses a dual band patch antenna constituted of flat plate-shaped radiation conductor and an annular radiation conductor, and JP 2007-060609 A discloses a dual band patch antenna provided with two partially common radiation conductors. JP 2002-299948 A discloses a configuration in which a feed line is branched in the middle thereof and connected to different radiation conductors.

However, in the dual band patch antennas described respectively in JP 2015-502723 A, JP 2007-060609 A, and JP 2002-299948 A, the two radiation conductors mutually interfere, so that when the size or shape of one radiation conductor is changed, the resonance frequency or impedance of the other radiation conductor is significantly changed. This poses a problem in that it is difficult to individually adjust the resonance frequency or impedance of the radiation conductors.

SUMMARY

It is therefore an object of the present invention to provide a dual band patch antenna capable of easily adjusting the resonance frequency or impedance.

A dual band patch antenna according to the present invention includes: a first feeding part; first and second radiation conductors; a first feeding conductor having one end connected to the first feeding part and the other end connected to the first radiation conductor; a second feeding conductor having one end connected to the first feeding part and the other end connected to the second radiation conductor; a first open stub having one end connected to the first feeding conductor and the other end opened; and a second open stub having one end connected to the second feeding conductor and the other end opened.

According to the present invention, an antenna resonance signal of the second radiation conductor propagating through the first feeding conductor is interrupted by the first open stub, and an antenna resonance signal of the first radiation conductor propagating through the second feeding conductor is interrupted by the second open stub, so that two frequency bands can be adjusted independently of each other. Therefore, it is possible to adjust the resonance frequency or impedance of the dual band patch antenna more easily than ever before.

In the present invention, the first radiation conductor may be larger than the second radiation conductor, and the first open stub may be shorter than the second open stub. With this configuration, it is possible to prevent mutual interference between the first and second radiation conductors while using the first radiation conductor as a radiation conductor for low frequency band and the second radiation conductor as a radiation conductor for high frequency band.

In the present invention, the first feeding conductor may include a first vertical feeding conductor having one end connected to a predetermined planar position of the first radiation conductor and a first horizontal feeding conductor connecting the other end of the first vertical feeding conductor and the first feeding part, the second feeding conductor may include a second vertical feeding conductor having one end connected to a predetermined planar position of the second radiation conductor and a second horizontal feeding conductor connecting the other end of the second vertical feeding conductor and the first feeding part, the first open stub may be connected to the first horizontal feeding conductor, and the second open stub may be connected to the second horizontal feeding conductor. With this configuration, the first horizontal feeding conductor and first open stub can be formed in the same wiring layer, and the second horizontal feeding conductor and second open stub can be formed in the same wiring layer.

The dual band patch antenna according to the present invention may further include: a second feeding part; a third feeding conductor having one end connected to the second feeding part and the other end connected to the first radiation conductor; a fourth feeding conductor having one end connected to the second feeding part and the other end connected to the second radiation conductor; a third open stub having one end connected to the third feeding conductor and the other end opened; and a fourth open stub having one end connected to the fourth feeding conductor and the other end opened. With this configuration, two feeding signals having mutually different phases can be supplied to each of the first and second radiation conductors, so that the first and second radiation conductors can be used as a dual-polarized antenna. In addition, an antenna resonance signal of the second radiation conductor propagating through the third feeding conductor can be interrupted by the third open stub, and an antenna resonance signal of the first radiation conductor propagating through the fourth feeding conductor can be interrupted by the fourth open stub.

In the present invention, the third open stub may be shorter than the fourth open stub. With this configuration, an antenna resonance signal in a high frequency band propagating through the third feeding conductor can be interrupted by the third open stub, and an antenna resonance signal in a low frequency band propagating through the fourth feeding conductor can be interrupted by the fourth open stub.

In the present invention, the third feeding conductor may include a third vertical feeding conductor having one end connected to a planar position different from the predetermined planar position of the first radiation conductor and a third horizontal feeding conductor connecting the other end of the third vertical feeding conductor and the second feeding part, the fourth feeding conductor may include a fourth vertical feeding conductor having one end connected to a planar position different from the predetermined planar position of the second radiation conductor and a fourth horizontal feeding conductor connecting the other end of the fourth vertical feeding conductor and the second feeding part, the third open stub may be connected to the third horizontal feeding conductor, and the fourth open stub may be connected to the fourth horizontal feeding conductor. With this configuration, the third horizontal feeding conductor and third open stub can be formed in the same wiring layer, and the fourth horizontal feeding conductor and fourth open stub can be formed in the same wiring layer.

The dual band patch antenna according to the present invention may further include a first excitation conductor disposed parallel to the first radiation conductor so as to overlap the first radiation conductor and a second excitation conductor disposed parallel to the second radiation conductor so as to overlap the second radiation conductor. With this configuration, the first and second excitation conductors are excited by the first and second radiation conductors, respectively, so that antenna characteristics can be improved.

In the present invention, the first and second excitation conductors may be in a floating state. With this configuration, it is possible to widen antenna bandwidth.

In the present invention, the distance between the first radiation conductor and the first excitation conductor may differ from the distance between the second radiation conductor and the second excitation conductor. Thus, adjustment of antenna characteristics by the excitation conductor can be made individually.

In the present invention, a plurality of sets of the first and second radiation conductors may be arranged. This allows a so-called phased array antenna to be constituted. In this case, the plurality of sets of the first and second radiation conductors may be arranged in one direction or in a matrix.

In the present invention, the sides of the first radiation conductor and the sides of the second radiation conductor may not have portions parallel to each other. With this configuration, mutual interference between the first and second radiation conductors can be reduced further.

As described above, according to the present invention, there can be provided a dual band patch antenna capable of easily adjusting the resonance frequency or impedance.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will be explained below in detail with reference to the accompanying drawings.

First Embodiment

Figure 1:
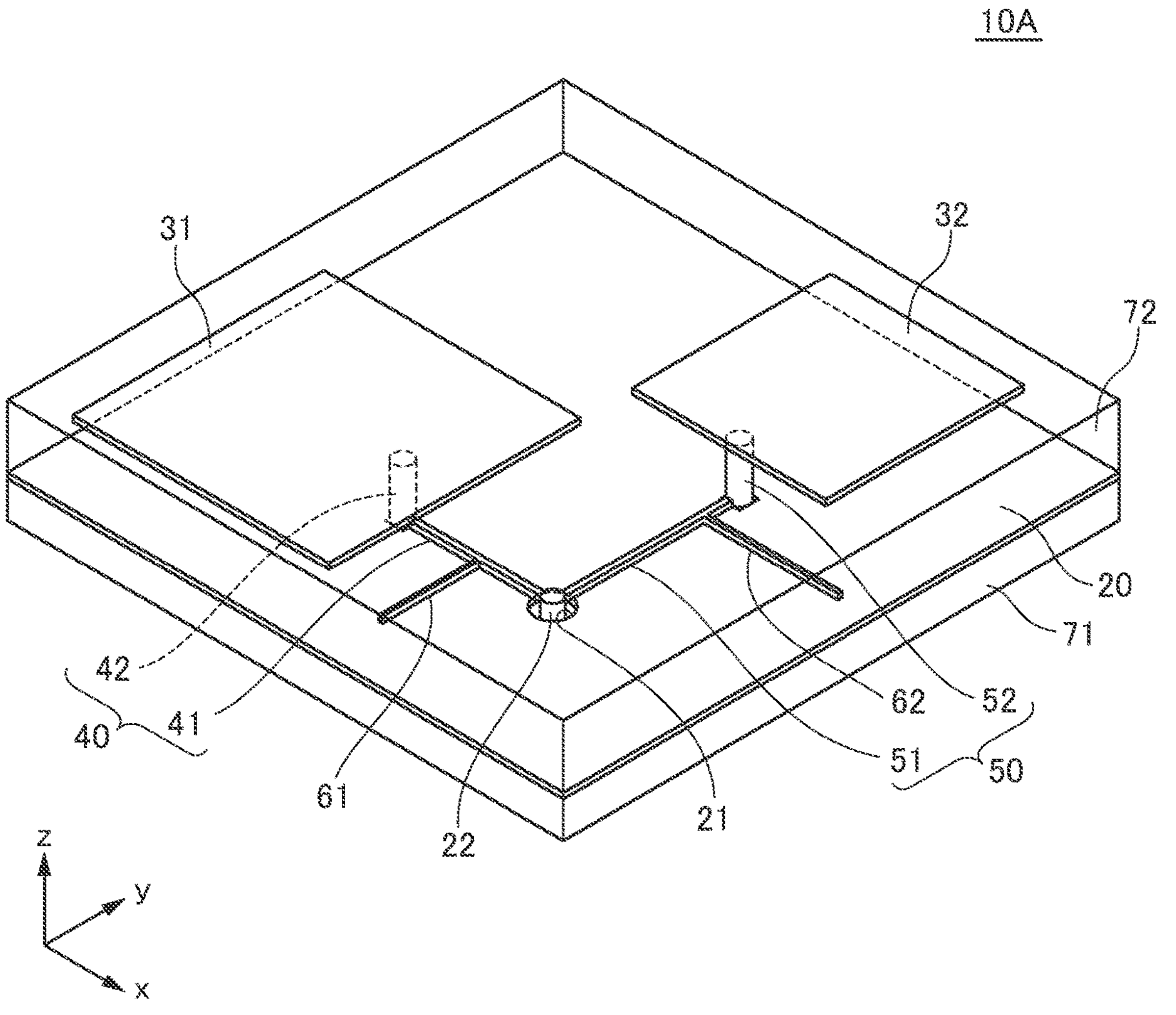
FIG. 1 is a schematic perspective view illustrating the configuration of a dual band patch antenna according to a first embodiment of the present invention.
Figure 2:
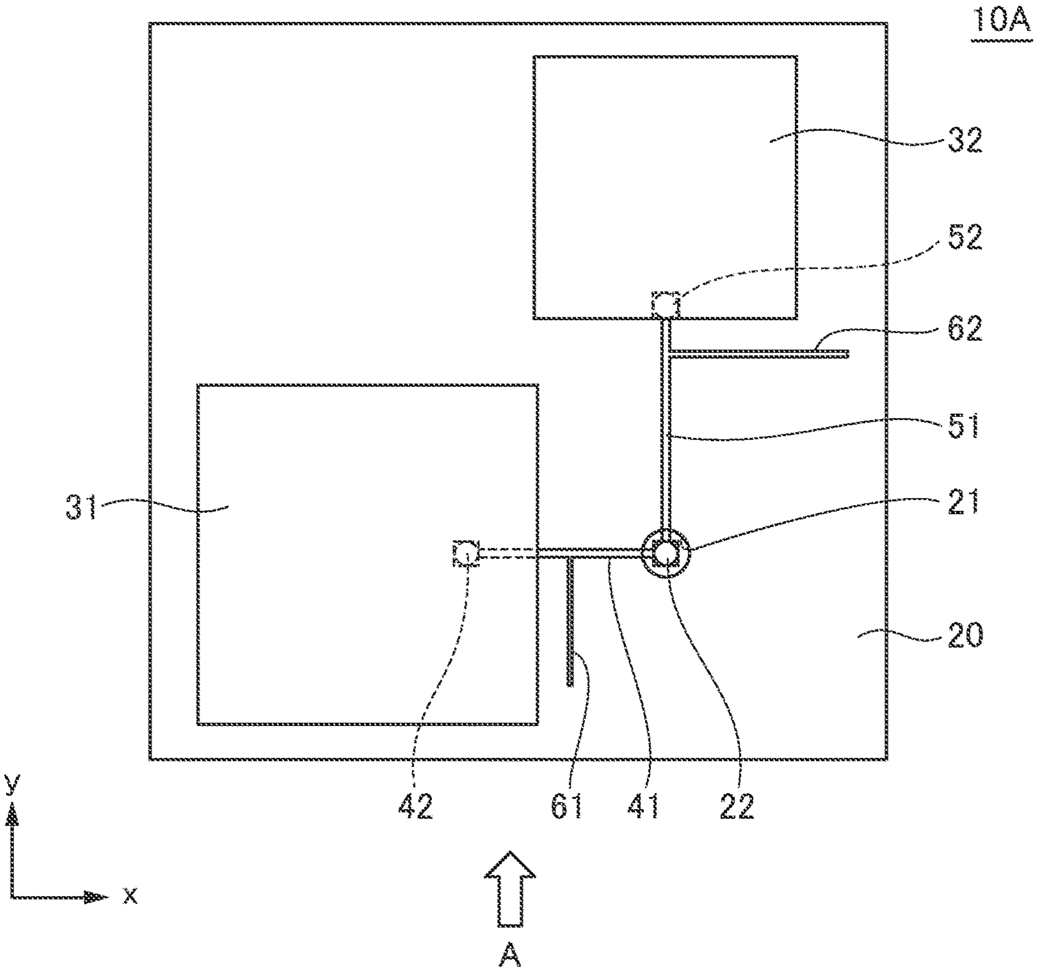
FIG. 2 is a transparent plan view of the dual band patch antenna shown in FIG. 1.

FIG. 1 is a schematic perspective view illustrating the configuration of a dual band patch antenna 10A according to the first embodiment of the present invention. FIG. 2 is a transparent plan view of the dual band patch antenna 10A, and FIG. 3 is a transparent side view of the dual band patch antenna 10A as viewed in the direction of arrow A of FIG. 2.

Figure 3:
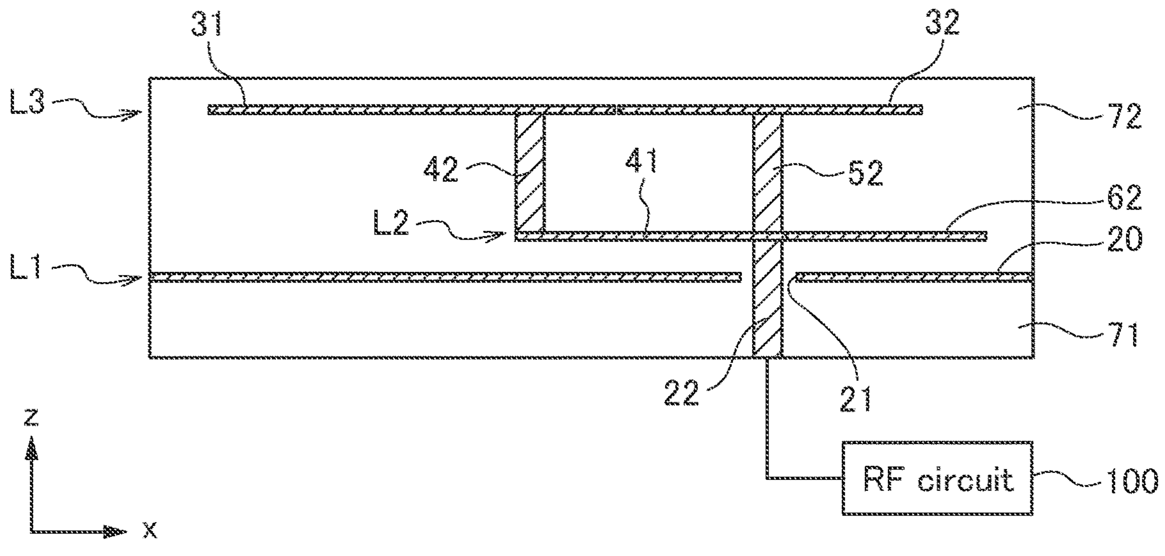
FIG. 3 is a transparent side view of the dual band patch antenna as viewed in the direction of arrow A of FIG. 2.

As illustrated in FIGS. 1 to 3, the dual band patch antenna 10A according to the present embodiment includes a flat plate-shaped ground pattern 20 formed on a substrate 71 and first and second radiation conductors 31 and 32 provided overlapping the ground pattern 20. The ground pattern 20 is a solid pattern provided in a conductor layer L1 and constitutes the xy plane. The ground pattern 20 has an opening 21 and is removed at this portion. A feeding part 22 is provided penetrating the opening 21. As illustrated in FIG. 3, the feeding part 22 is a pillar-shaped conductor extending in the z-direction and connected, at one end, to an RF circuit 100 provided outside the dual band patch antenna 10A. The feeding part 22 is connected, at the other end, to the first radiation conductor 31 through a first feeding conductor 40 and to the second radiation conductor 32 through a second feeding conductor 50.

The feeding part 22 penetrates the conductor layer L1 in which the ground pattern 20 is formed and reaches a conductor layer L2 positioned above the conductor layer L1 as its upper layer. The conductor layer L2 includes two horizontal feeding conductors 41 and 51 and two open stubs 61 and 62. The first and second radiation conductors 31 and 32 are formed in a conductor layer L3 positioned above the conductor layer L2 as its upper layer.

The first horizontal feeding conductor 41 extends in the x-direction from the feeding part 22 and is connected to a first vertical feeding conductor 42. The first horizontal feeding conductor 41 and the first vertical feeding conductor 42 constitute the first feeding conductor 40. The first vertical feeding conductor 42 is a pillar-shaped conductor provided at a position overlapping the first radiation conductor 31 and connects the end portion of the first horizontal feeding conductor 41 and the first radiation conductor 31 at a predetermined planar position. One end of the first open stub 61 is connected to the first horizontal feeding conductor 41, and the other end thereof is opened. The length of the first open stub 61 is designed to be about ¼ of the wavelength of a second antenna resonance signal radiated from the second radiation conductor 32. As a result, the second antenna resonance signal propagating through the first horizontal feeding conductor 41 is interrupted by the first open stub 61, thus preventing the second antenna resonance signal from reaching the first radiation conductor 31 through the first feeding conductor 40.

The second horizontal feeding conductor 51 extends in the y-direction from the feeding part 22 and is connected to a second vertical feeding conductor 52. The second horizontal feeding conductor 51 and the second vertical feeding conductor 52 constitute the second feeding conductor 50. The second vertical feeding conductor 52 is a pillar-shaped conductor provided at a position overlapping the second radiation conductor 32 and connects the end portion of the second horizontal feeding conductor 51 and the second radiation conductor 32 at a predetermined planar position. One end of the second open stub 62 is connected to the second horizontal feeding conductor 51, and the other end thereof is opened. The length of the second open stub 62 is designed to be about ¼ of the wavelength of a first antenna resonance signal radiated from the first radiation conductor 31. As a result, the first antenna resonance signal propagating through the second horizontal feeding conductor 51 is interrupted by the second open stub 62, thus preventing the first antenna resonance signal from reaching the second radiation conductor 32 through the second feeding conductor 50.

The conductor layers L1 to L3 are covered with an insulating layer 72 made of a dielectric material. Thus, at least the first and second radiation conductors 31, 32, first and second feeding conductors 40, 50, and first and second open stubs 61 and 62 are embedded in the dielectric material. As the dielectric material, a material excellent in high frequency characteristics such as ceramic or liquid crystal polymer is preferably selected.

The first and second radiation conductors 31 and 32 each have a substantially square shape, but they have different planar sizes. Specifically, the first radiation conductor 31 is larger in planar size than the second radiation conductor 32. Thus, the first radiation conductor 31 is used as a radiation conductor for low frequency band, and the second radiation conductor 32 is as a radiation conductor for high frequency band. Correspondingly, the length of the first open stub 61 is designed to be smaller than that of the second open stub 62.

Figure 4:
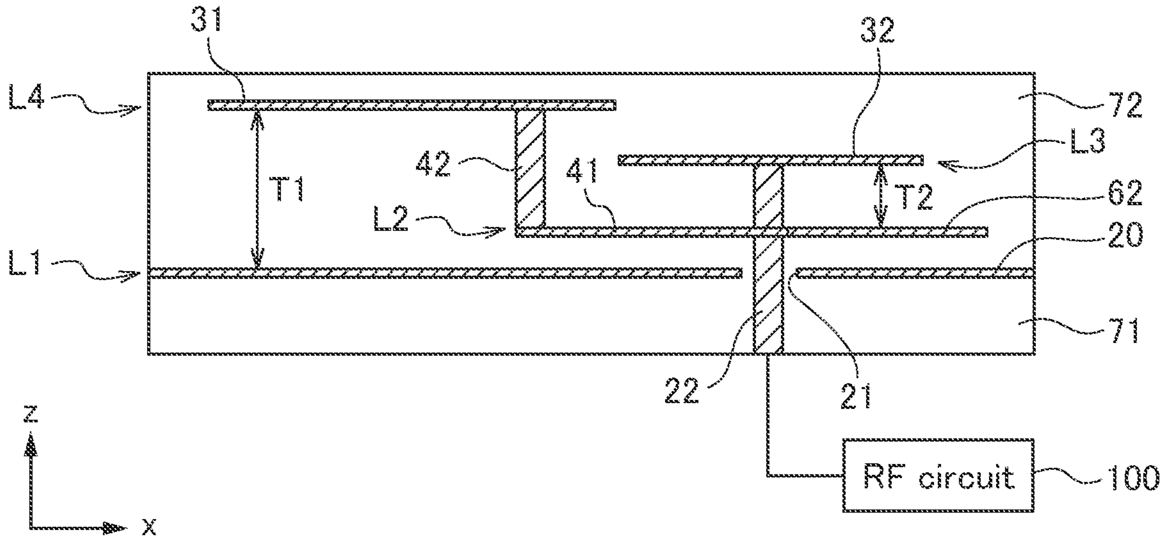
FIG. 4 is a transparent side view of a dual band patch antenna according to a modification.

In the present embodiment, both the first and second radiation conductors 31 and 32 are provided in the conductor layer L3, so that the number of wiring layers can be reduced; however, they may be formed in mutually different conductor layers like a modification illustrated in FIG. 4. Specifically, in the example of FIG. 4, the second radiation conductor 32 is provided in the conductor layer L3, and the first radiation conductor 31 is provided in a conductor layer L4 positioned above the conductor layer L3 as its upper layer. Thus, a distance T1 between the ground pattern 20 and the first radiation conductor 31 in the z-direction is larger than a distance T2 between the ground pattern 20 and the second radiation conductor 32 in the z-direction. To obtain high emission efficiency, the distance T1 is preferably equal to or less than the wavelength of the first antenna resonance signal radiated from the first radiation conductor 31, and the distance T2 is preferably equal to or less than the wavelength of the second antenna resonance signal radiated from the second radiation conductor 32. This also allows a reduction in the z-direction thickness of the dual band patch antenna 10A. Further, when the first and second radiation conductors 31 and 32 are formed in mutually different conductor layers as in the example of FIG. 4, antenna characteristics can be individually adjusted more easily.

In the present embodiment, the connection position of the first vertical feeding conductor 42 to the first radiation conductor 31 is set to a position coinciding with the center position of the first radiation conductor 31 in the y-direction and offset in the x-direction from the center position of the first radiation conductor 31. The connection position of the second vertical feeding conductor 52 to the second radiation conductor 32 is set to a position coinciding with the center position of the second radiation conductor 32 in the x-direction and offset in the y-direction from the center position of the second radiation conductor 32.

Figure 5:
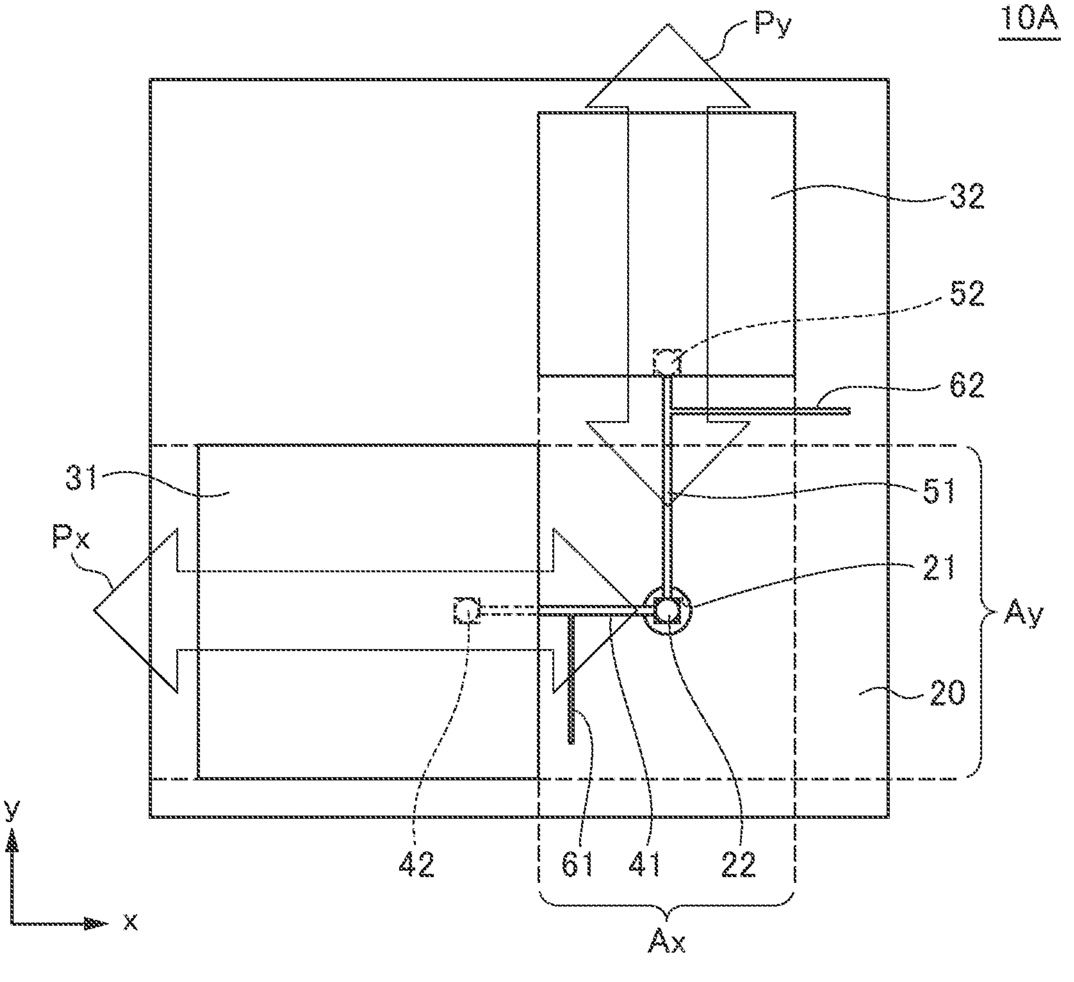
FIG. 5 is a diagram for explaining an oscillating direction of beams radiated from two radiation conductors.

Thus, as illustrated in FIG. 5, an oscillating direction Px of a beam radiated from the first radiation conductor 31 is the x-direction, and an oscillating direction Py of a beam radiated from the second radiation conductor 32 is the y-direction. Thus, in the present embodiment, the oscillating direction of the beam radiated from the first radiation conductor 31 and that of the beam radiated from the second radiation conductor 32 are orthogonal to each other, so that mutual interference is less likely to occur.

Particularly, as illustrated in FIG. 5, the first and second radiation conductors 31 and 32 are preferably laid out such that an arrangement range Ay of the first radiation conductor 31 in the y-direction does not overlap the second radiation conductor 32 in a plan view and that an arrangement range Ax of the second radiation conductor 32 in the x-direction does not overlap the first radiation conductor 31 in a plan view. That is, preferably, the first and second radiation conductors 31 and 32 overlap each other in neither the x- nor y-direction. This further reduces mutual interference.

As described above, in the dual band patch antenna 10A according to the present embodiment, the first and second radiation conductors 31 and 32 are provided independently of each other, so that even when the size or shape of one radiation conductor is changed, a change in the resonance frequency or impedance of the other radiation conductor can be suppressed. Thus, as compared to conventional dual band patch antennas, antenna characteristics such as the resonance frequency or impedance can be adjusted easily, facilitating the design. Particularly, in the dual band patch antenna 10A according to the present embodiment, the first and second radiation conductors 31 and 32 overlap each other in neither the x- nor y-direction, thereby making it possible to significantly reduce mutual interference.

In addition, the dual band patch antenna 10A has the first and second open stubs 61 and 62, so that the antenna resonance signal of the second radiation conductor 32 propagating through the first feeding conductor 40 is interrupted by the first open stub 61, and the antenna resonance signal of the first radiation conductor 31 propagating through the second feeding conductor 50 is interrupted by the second open stub 62. As a result, two frequency bands can be adjusted independently of each other, thus making it possible to easily adjust the resonance frequency or impedance of the dual band patch antenna. Further, the first and second open stubs 61 and 62 are formed in the same layer (conductor layer L2) as the first and second horizontal feeding conductors 41 and 51, thus eliminating the need to additionally form a conductor layer for the first and second open stubs 61 and 62.

Further, in the present embodiment, both the first and second radiation conductors 31 and 32 are supplied with power from the feeding part 22, so that the dual band patch antenna 10A according to the present embodiment and the RF circuit 100 can be connected to each other by one feeding line. This also facilitates the design of a feeding line outside the dual band patch antenna 10A.

The above effects are particularly prominent in an application where antenna characteristics are significantly changed by a slight change in a wiring pattern such as wiring length or wiring position as in the case where the resonance frequency is millimeter wave band and are thus expected to significantly reduce design burden.

Figure 6:
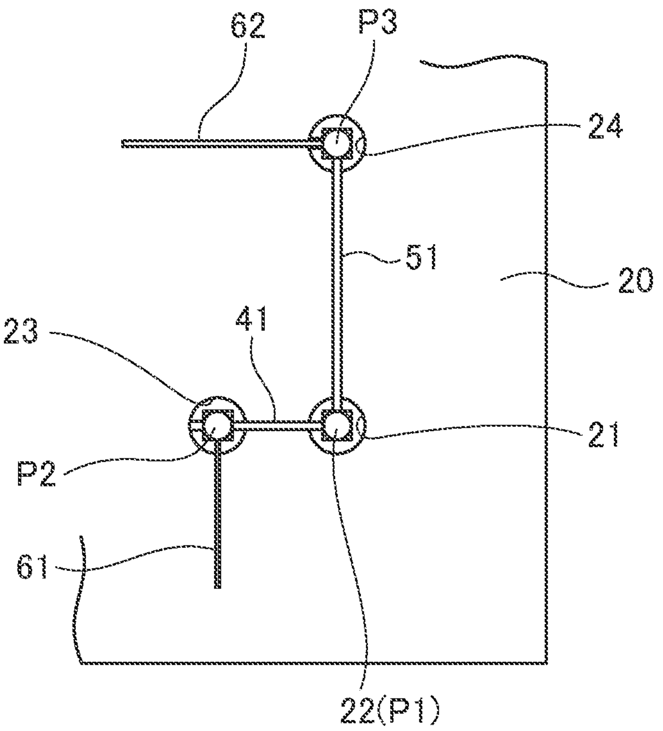
FIG. 6 is a plan view illustrating a simulation model for verifying the effect of the open stub.

FIG. 6 is a plan view illustrating a simulation model for verifying the effect of the open stub.

In the simulation model illustrated in FIG. 6, the first and second horizontal feeding conductors 41 and 51 are branched from the feeding part 22 provided penetrating the opening 21 of the ground pattern 20, the first horizontal feeding conductor 41 being connected with the first open stub 61, the second horizontal feeding conductor 51 being connected with the second open stub 62. The feeding part 22 constitutes a port P1. The ground pattern 20 has an opening 23 at a position overlapping a connection point between the first horizontal feeding conductor 41 and the first open stub 61 in a plan view, and a port P2 is led out through the opening 23. Further, the ground pattern 20 has an opening 24 at a position overlapping a connection point between the second horizontal feeding conductor 51 and the second open stub 62 in a plan view, and a port P3 is led out through the opening 24.

Figure 7:
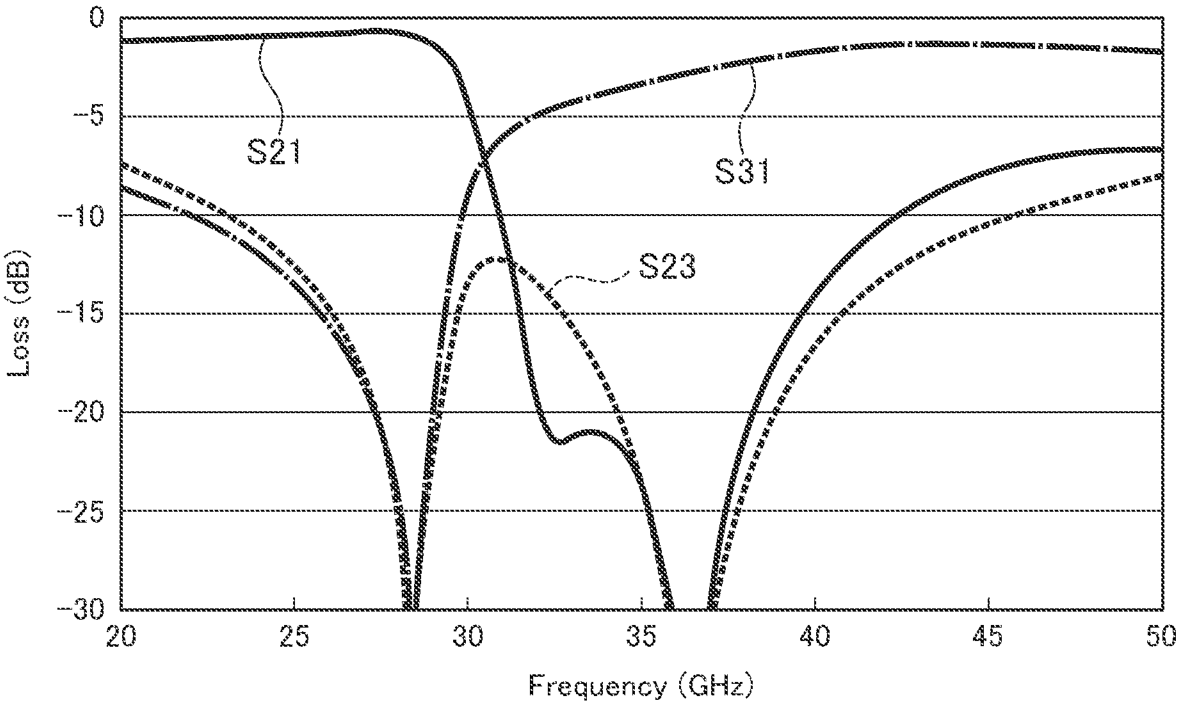
FIG. 7 is a graph illustrating the passage characteristics of the simulation model of FIG. 6.

FIG. 7 is a graph illustrating the passage characteristics of the simulation model of FIG. 6.

In FIG. 7, an S21 characteristic (passage characteristics from the port P1 to the port P2), an S31 characteristic (passage characteristics from the port P1 to the port P3), and an S23 characteristic (passage characteristics from the port P3 to the port P2) are illustrated. As illustrated in FIG. 7, the S21 characteristic exhibits a large loss in frequency range around 35 GHz to 40 GHz and exhibits a small loss around 25 GHz to 30 GHz. This is because a signal around 35 GHz to 40 GHz propagating through the first horizontal feeding conductor 41 is interrupted by the first open stub 61. On the other hand, the S31 characteristic exhibits a large loss in frequency range around 25 GHz to 30 GHz and exhibits a small loss around 35 GHz to 40 GHz. This is because a signal around 25 GHz to 30 GHz propagating through the second horizontal feeding conductor 51 is interrupted by the second open stub 62. Thus, when a radiation conductor with a resonance frequency of 25 GHz to 30 GHz (e.g., 28 GHz) is connected to the port P2, and a radiation conductor with a resonance frequency of 35 GHz to 40 GHz (e.g., 39 GHz) is connected to the port P3, a dual band patch antenna can be constituted. In addition, the S23 characteristic exhibits a large loss in both frequency ranges around 25 GHz to 30 GHz and around 35 GHz to 40 GHz, interference between the two radiation conductors does not occur.

Second Embodiment

Figure 8:
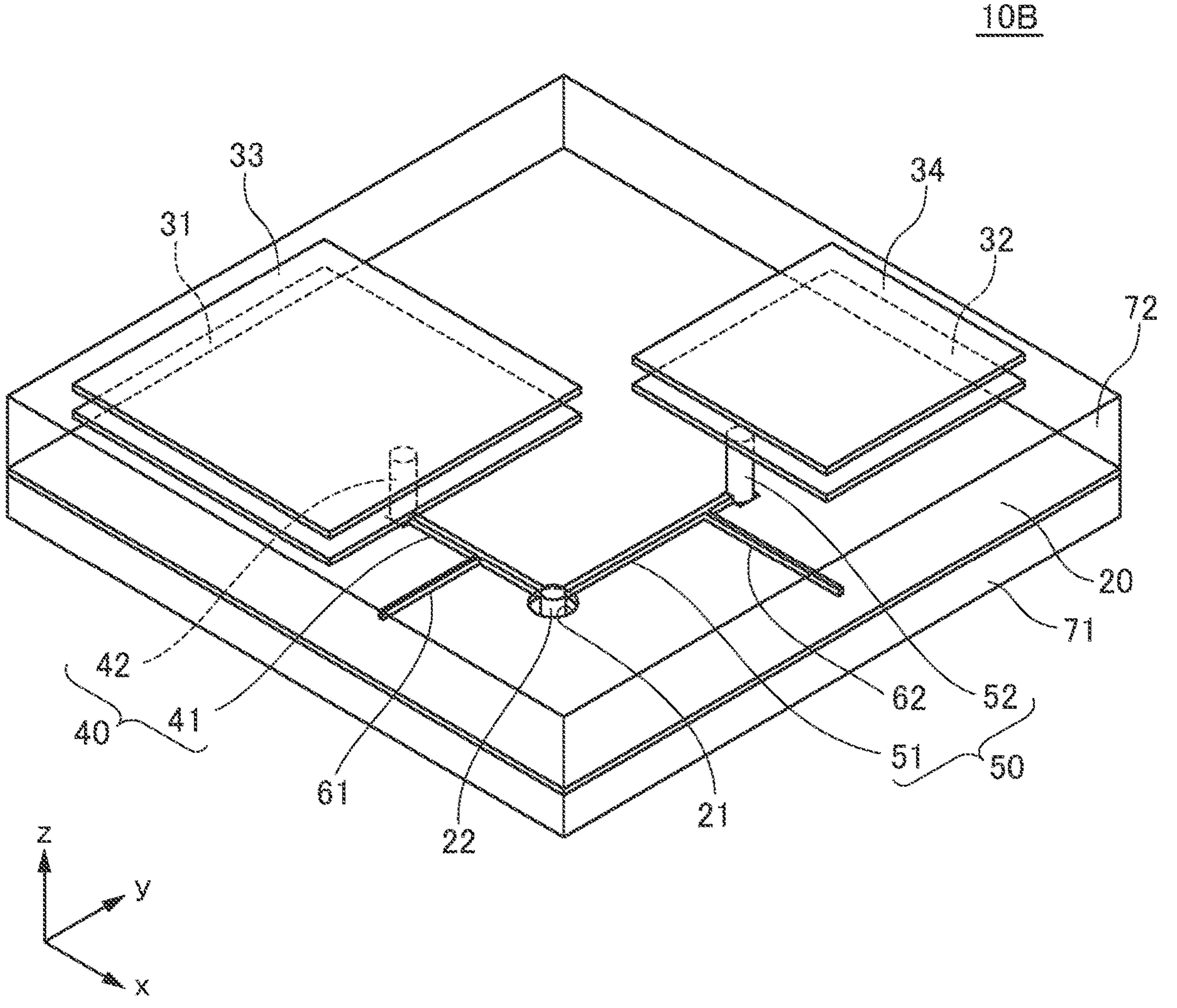
FIG. 8 is a schematic perspective view illustrating the configuration of a dual band patch antenna according to a second embodiment of the present invention.

FIG. 8 is a schematic perspective view illustrating the configuration of a dual band patch antenna 10B according to the second embodiment of the present invention.

As illustrated in FIG. 8, the dual band patch antenna 10B according to the present embodiment differs from the dual band patch antenna 10A according to the first embodiment in that it further includes first and second excitation conductors 33 and 34. Other configurations are basically the same as those of the dual band patch antenna 10A according to the first embodiment, so the same reference numerals are given to the same elements, and overlapping description will be omitted.

The first excitation conductor 33 is a flat plate-shaped conductor positioned on the opposite side of the ground pattern 20 across the first radiation conductor 31 and is disposed parallel to the first radiation conductor 31 so as to overlap the first radiation conductor 31 in the z-direction. That is, the first excitation conductor 33 also has the xy plane, and the first radiation conductor 31 is sandwiched between the first excitation conductor 33 and the ground pattern 20.

The second excitation conductor 34 is a flat plate-shaped conductor positioned on the opposite side of the ground pattern 20 across the second radiation conductor 32 and is disposed parallel to the second radiation conductor 32 so as to overlap the second radiation conductor 32 in the z-direction. That is, the second excitation conductor 34 also has the xy plane, and the second radiation conductor 32 is sandwiched between the second excitation conductor 34 and the ground pattern 20.

The first and second excitation conductors 33 and 34 are in a floating state where they are not connected to any wiring lines and are excited by electromagnetic waves radiated from the first and second radiation conductors 31 and 32, respectively. As a result, electromagnetic waves are radiated also from the first and second excitation conductors 33 and 34, allowing the antenna bandwidth to be widened. The planar size of the first and second excitation conductors 33 and 34, distance between the first excitation conductor 33 and the first radiation conductor 31, and distance between the second excitation conductor 34 and the second radiation conductor 32 may be designed according to radiation characteristics required for the first and second excitation conductors 33 and 34.

Figure 9:
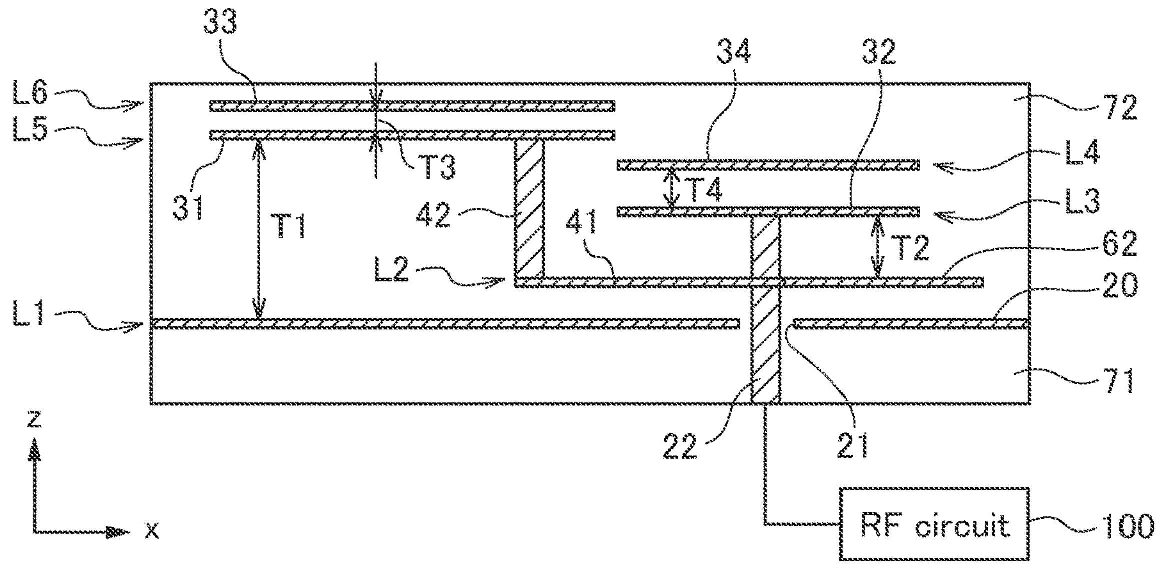
FIG. 9 is a transparent side view of the dual band patch antenna shown in FIG. 8.

For example, as illustrated in FIG. 9, the following configuration is possible: the second radiation conductor 32 and the second excitation conductor 34 are disposed in conductor layers L3 and L4, respectively, and the first radiation conductor 31 and the first excitation conductor 33 are disposed in conductor layers L5 and L6, respectively. In the example of FIG. 9, a distance T3 between the first radiation conductor 31 and first excitation conductor 33 is smaller than a distance T4 between the second radiation conductor 32 and the second excitation conductor 34; however, this is not essential, but the distances T3 and T4 may be designed according to the desired antenna characteristics. Further, to obtain high radiation efficiency, the distance T3 is preferably equal to or less than the wavelength of the first antenna resonance signal radiated from the first radiation conductor 31, and the distance T4 is preferably equal to or less than the wavelength of the second antenna resonance signal radiated from the second radiation conductor 32.

Third Embodiment

Figure 10:
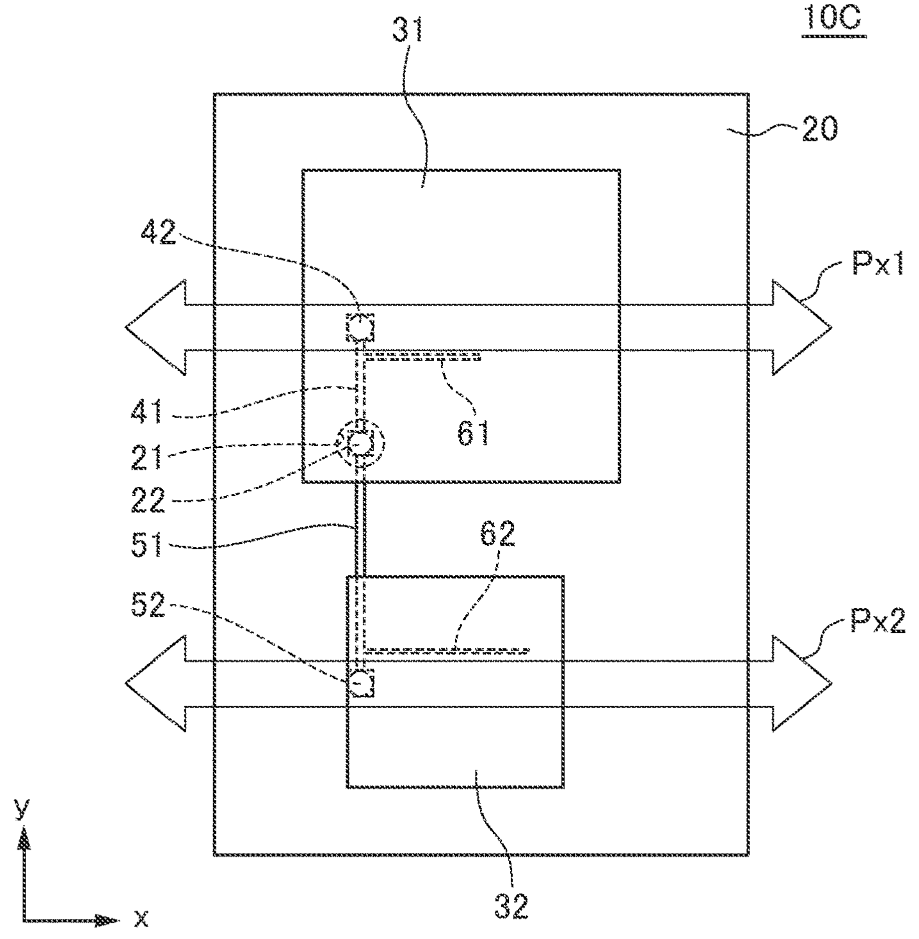
FIG. 10 is a transparent plan view illustrating the configuration of a dual band patch antenna according to a third embodiment of the present invention.

FIG. 10 is a transparent plan view illustrating the configuration of a dual band patch antenna 10C according to the third embodiment of the present invention.

As illustrated in FIG. 10, the dual band patch antenna 10C according to the present embodiment differs from the dual band patch antenna 10A according to the first embodiment in that the first and second radiation conductors 31 and 32 are arranged side by side in the y-direction. This can make the planar size of the patch antenna 10C smaller than that of the dual band patch antenna 10A according to the first embodiment.

Figure 11:
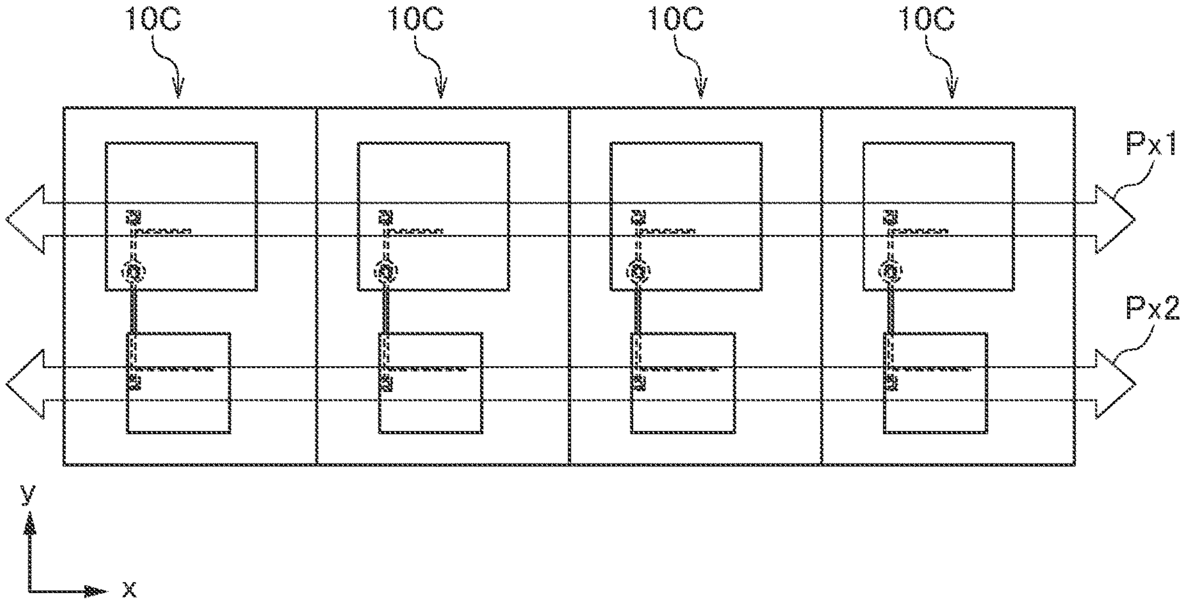
FIG. 11 is a diagram illustrating a configuration in which plural dual band patch antennas according to the third embodiment of the present invention are arranged.

Further, in the present embodiment, the connection position of the second vertical feeding conductor 52 to the second radiation conductor 32 is set to a position coinciding with the center position of the second radiation conductor 32 in the y-direction and offset in the x-direction from the center position of the second radiation conductor 32. Thus, as illustrated in FIG. 10, an oscillating direction Px1 of a beam radiated from the first radiation conductor 31 is the x-direction, and an oscillating direction Px2 of a beam radiated from the second radiation conductor 32 is also the x-direction. Thus, when a plurality of the dual band patch antennas 10C are arranged in the x-direction as illustrated in FIG. 11, a dual band phased array antenna can be constituted.

Further, in the present embodiment, the feeding part 22 overlaps the first radiation conductor 31 in a plan view. Further, the first and second open stubs 61 and 62 overlap the first and second radiation conductors 31 and 32, respectively. As exemplified in the present embodiment, in the present invention, the feeding part or open stub may overlap the radiation conductor.

Fourth Embodiment

Figure 12:
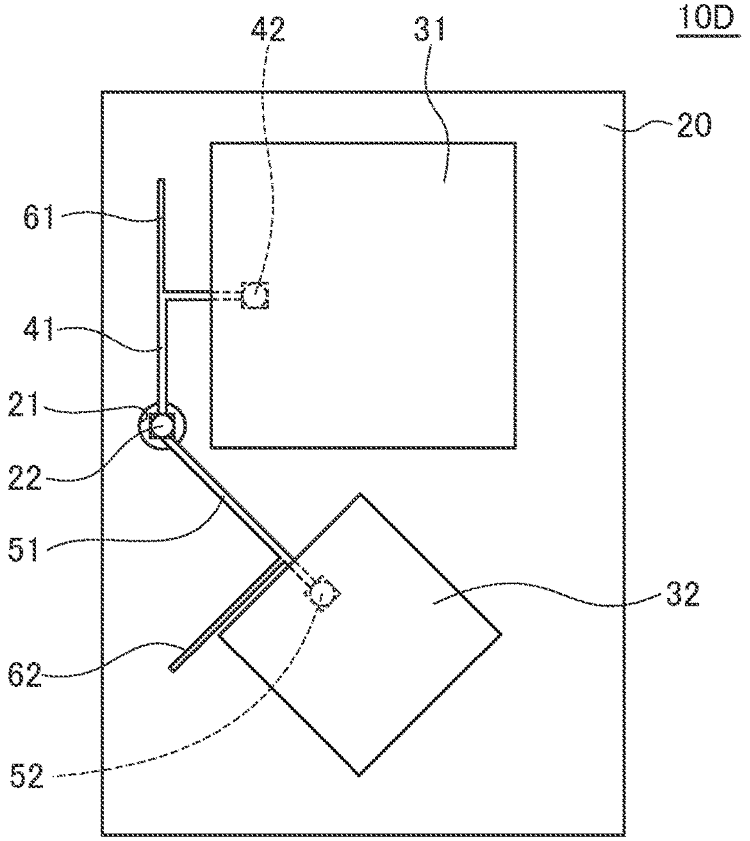
FIG. 12 is a transparent plan view illustrating the configuration of a dual band patch antenna according to a fourth embodiment of the present invention.

FIG. 12 is a transparent plan view illustrating the configuration of a dual band patch antenna 10D according to the fourth embodiment of the present invention.

As illustrated in FIG. 12, the dual band patch antenna 10D according to the present embodiment differs from the dual band patch antenna 10C according to the third embodiment in that the second radiation conductor 32 is inclined by 45° in the xy plane. Accordingly, the oscillating direction of a beam radiated from the second radiation conductor 32 is also inclined by 45°, making mutual interference between the first and second radiation conductors 31 and 32 less likely to occur than in the dual band patch antenna 10C according to the third embodiment.

Figure 13:
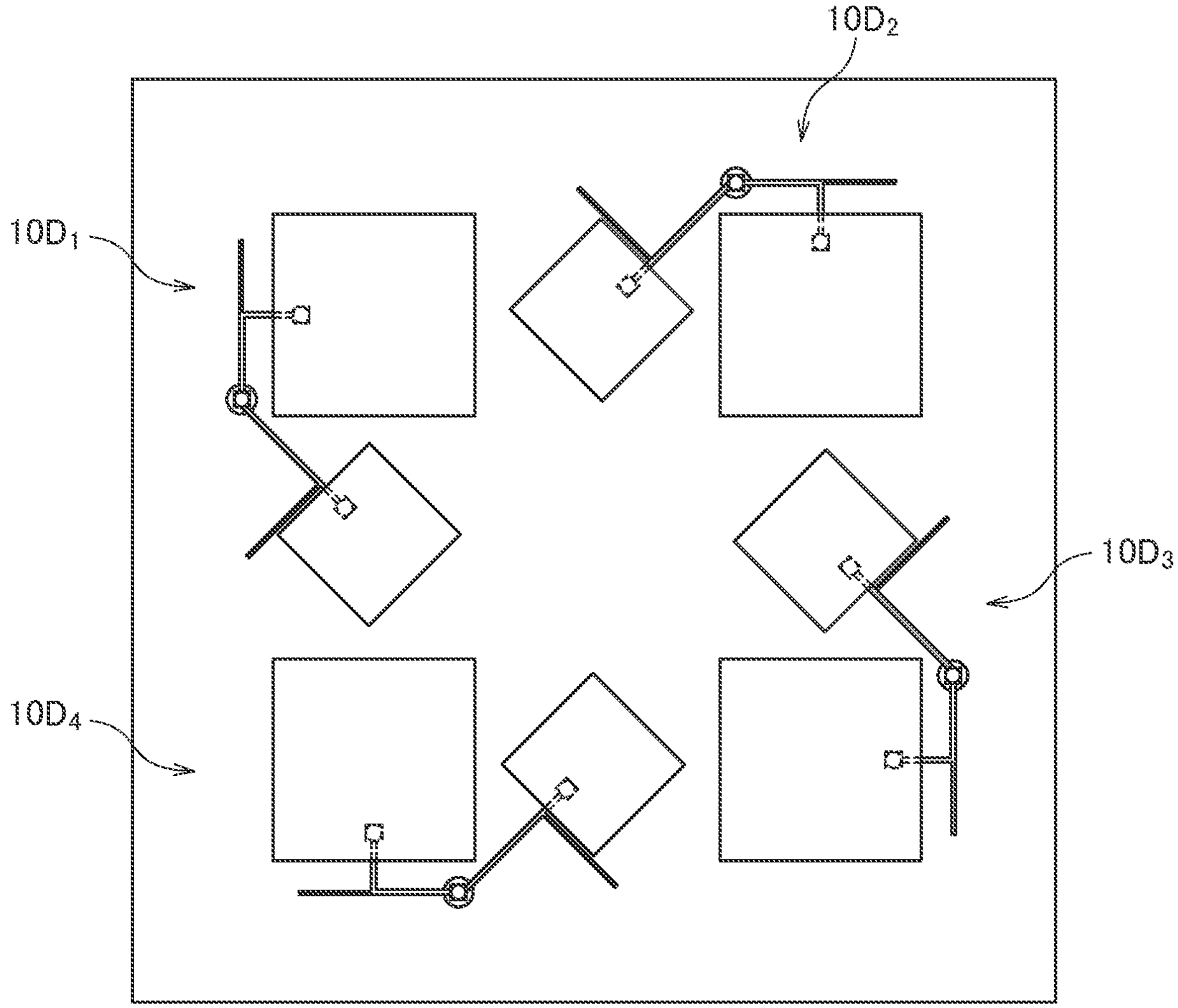
FIG. 13 is a diagram illustrating a configuration in which plural dual band patch antennas according to the fourth embodiment of the present invention are arranged.

When a plurality of the dual band patch antennas 10D according to the present embodiment are arranged in a matrix as illustrated in FIG. 13, a phased array antenna can be constituted. In the example of FIG. 13, a dual band patch antenna $\mathbf{10}D_2$ is rotated clockwise by 90° with respect to a dual band patch antenna $\mathbf{10}D_1$, a dual band patch antenna $\mathbf{10}D_3$ is rotated clockwise by 180° with respect to the dual band patch antenna $\mathbf{10}D_1$, and a dual band patch antenna $\mathbf{10}D_4$ is rotated clockwise by 270° with respect to the dual band patch antenna $\mathbf{10}D_1$. As a result, the oscillating directions of the respective first and second radiation conductors 31 and 32 included in the dual band patch antennas $\mathbf{10}D_1$ and $\mathbf{10}D_3$ are orthogonal to the oscillating directions of the respective first and second radiation conductors 31 and 32 included in the dual band patch antennas $\mathbf{10}D_2$ and $\mathbf{10}D_4$. In addition, the oscillating direction of the first radiation conductor 31 included in the dual band patch antennas $\mathbf{10}D_1$ to $\mathbf{10}D_4$ differs by 45° from the oscillating direction of the second radiation conductor 32 included in the dual band patch antennas $\mathbf{10}D_1$ to $\mathbf{10}D_4$, so that mutual interference is less likely to occur.

Further, in the present embodiment, the first horizontal feeding conductor 41 has a pattern shape folded by 90° in the middle thereof. As exemplified in the present embodiment, the horizontal feeding conductor may not necessarily have a linear shape, and may have a shape folded in the middle or may have a curved shape. Further, although the second radiation conductor 32 is inclined by 45° in the present embodiment, the inclination angle thereof is not limited to this, and by making layout at least such that the sides of the first radiation conductor 31 and sides of the second radiation conductor 32 do not have portions parallel to each other, mutual interference is reduced.

Fifth Embodiment

Figure 14:
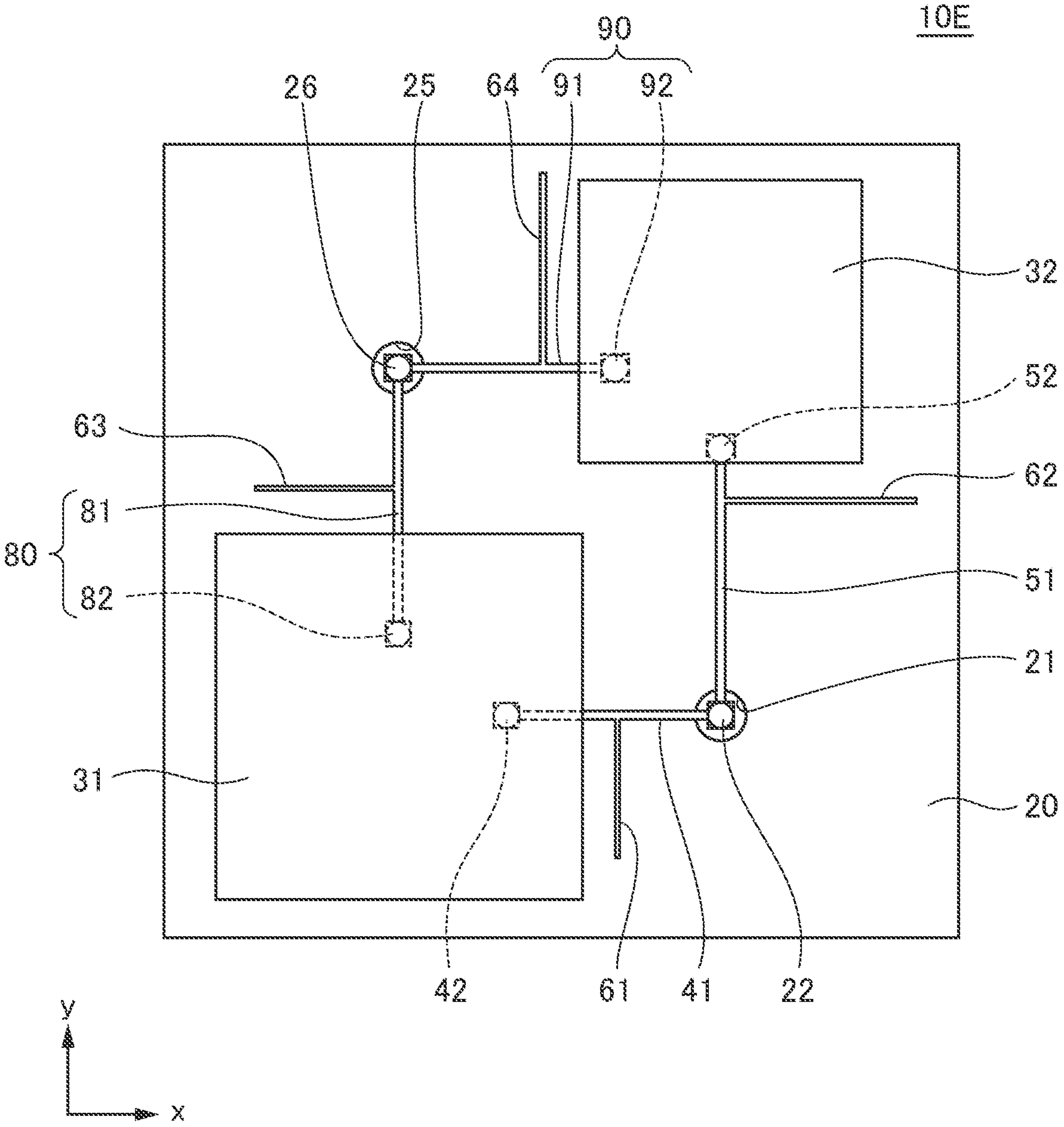
FIG. 14 is a transparent plan view illustrating the configuration of a dual band patch antenna according to a fifth embodiment of the present invention.

FIG. 14 is a transparent plan view illustrating the configuration of a dual band patch antenna 10E according to the fifth embodiment of the present invention.

As illustrated in FIG. 14, the dual band patch antenna 10E according to the present embodiment further includes a second feeding part 26, a third feeding conductor 80 connected to the second feeding part 26, a fourth feeding conductor 90 connected to the second feeding part 26, and third and fourth open stubs 63 and 64. The second feeding part 26 is a pillar-shaped conductor provided penetrating another opening 25 formed in the ground pattern 20 and connected to the RF circuit 100 as is the case with the first feeding part 22. Other configurations are the same as those of the dual band patch antenna 10A according to the first embodiment, so the same reference numerals are given to the same elements, and overlapping description will be omitted.

The third feeding conductor 80 has a third horizontal feeding conductor 81 and a third vertical feeding conductor 82. The third horizontal feeding conductor 81 extends in the y-direction from the feeding part 26 and is connected to the third vertical feeding conductor 82. The third vertical feeding conductor 82 is a pillar-shaped conductor provided at a position overlapping the first radiation conductor 31 and connects the end portion of the third horizontal feeding conductor 81 and the first radiation conductor 31 at a predetermined planar position. The connection positions of the respective vertical feeding conductors 42 and 82 to the first radiation conductor 31 differ from each other. Specifically, the connection position of the third vertical feeding conductor 82 to the first radiation conductor 31 is set to a position coinciding with the center position of the first radiation conductor 31 in the x-direction and offset in the y-direction from the center position of the first radiation conductor 31. One end of the third open stub 63 is connected to the third horizontal feeding conductor 81, and the other end thereof is opened. The length of the third open stub 63 is designed to be about ¼ of the wavelength of the second antenna resonance signal radiated from the second radiation conductor 32. As a result, the second antenna resonance signal propagating through the third horizontal feeding conductor 81 is interrupted.

The fourth feeding conductor 90 has a fourth horizontal feeding conductor 91 and a fourth vertical feeding conductor 92. The fourth horizontal feeding conductor 91 extends in the x-direction from the feeding part 26 and is connected to the fourth vertical feeding conductor 92. The fourth vertical feeding conductor 92 is a pillar-shaped conductor provided at a position overlapping the second radiation conductor 32 and connects the end portion of the fourth horizontal feeding conductor 91 and the second radiation conductor 32 at a predetermined planar position. The connection positions of the respective vertical feeding conductors 52 and 92 to the second radiation conductor 32 differ from each other. Specifically, the connection position of the fourth vertical feeding conductor 92 to the second radiation conductor 32 is set to a position coinciding with the center position of the second radiation conductor 32 in the y-direction and offset in the x-direction from the center position of the second radiation conductor 32. One end of the fourth open stub 64 is connected to the fourth horizontal feeding conductor 91, and the other end thereof is opened. The length of the fourth open stub 64 is designed to be about ¼ of the wavelength of the first antenna resonance signal radiated from the first radiation conductor 31. As a result, the first antenna resonance signal propagating through the fourth horizontal feeding conductor 91 is interrupted.

The dual band patch antenna 10E according to the present embodiment can supply two feeding signals having mutually different phases to each of the first and second radiation conductors 31 and 32, so that the first and second radiation conductors 31 and 32 can be used as a dual-polarized antenna.

Figure 15:
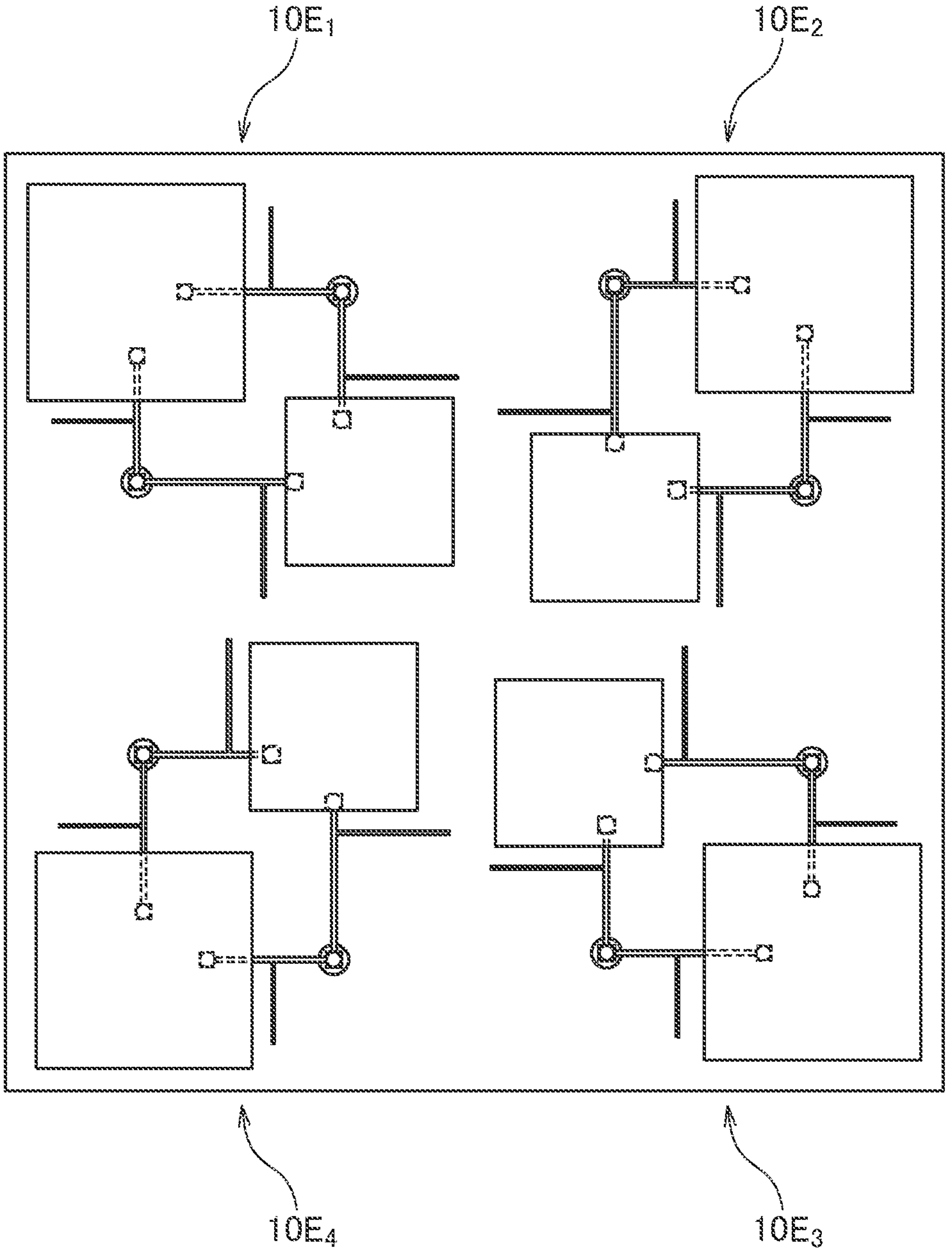
FIG. 15 is a diagram illustrating a configuration in which plural dual band patch antennas according to the fifth embodiment of the present invention are arranged.

When a plurality of the dual band patch antennas 10E according to the present embodiment are arranged in a matrix as illustrated in FIG. 15, a phased array antenna can be constituted. In the example of FIG. 15, a dual band patch antenna 10$E_2$ is rotated clockwise by 90° with respect to a dual band patch antenna 10$E_1$, a dual band patch antenna 10$E_3$ is rotated clockwise by 180° with respect to the dual band patch antenna 10$E_1$, and a dual band patch antenna 10$E_4$ is rotated clockwise by 270° with respect to the dual band patch antenna 10$E_1$.

Sixth Embodiment

Figure 16:
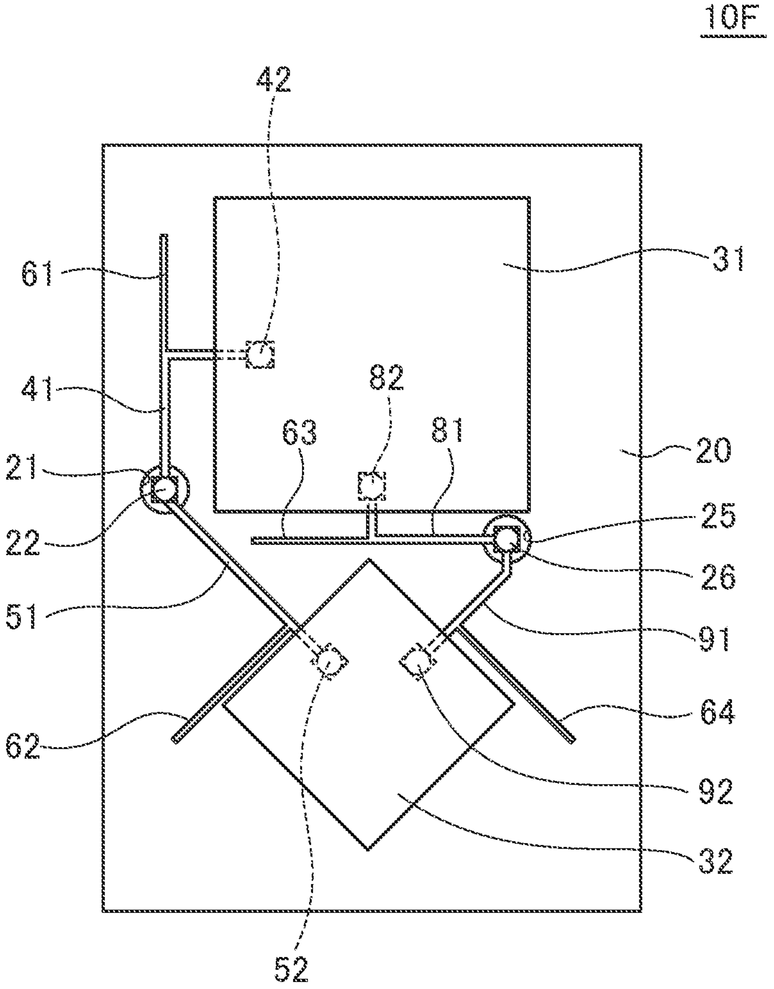
FIG. 16 is a transparent plan view illustrating the configuration of a dual band patch antenna according to a sixth embodiment of the present invention.

FIG. 16 is a transparent plan view illustrating the configuration of a dual band patch antenna 10F according to the sixth embodiment of the present invention.

As illustrated in FIG. 16, the dual band patch antenna 10F according to the present embodiment differs from the dual band patch antenna 10E according to the fifth embodiment in that the second radiation conductor 32 is inclined by 45° in the xy plane. Accordingly, the oscillating direction of a beam radiated from the second radiation conductor 32 is also inclined by 45°, so that it is possible to reduce the entire planar size while suppressing mutual interference between the first and second radiation conductors 31 and 32 as compared to the dual band patch antenna 10E according to the fifth embodiment.

Figure 17:
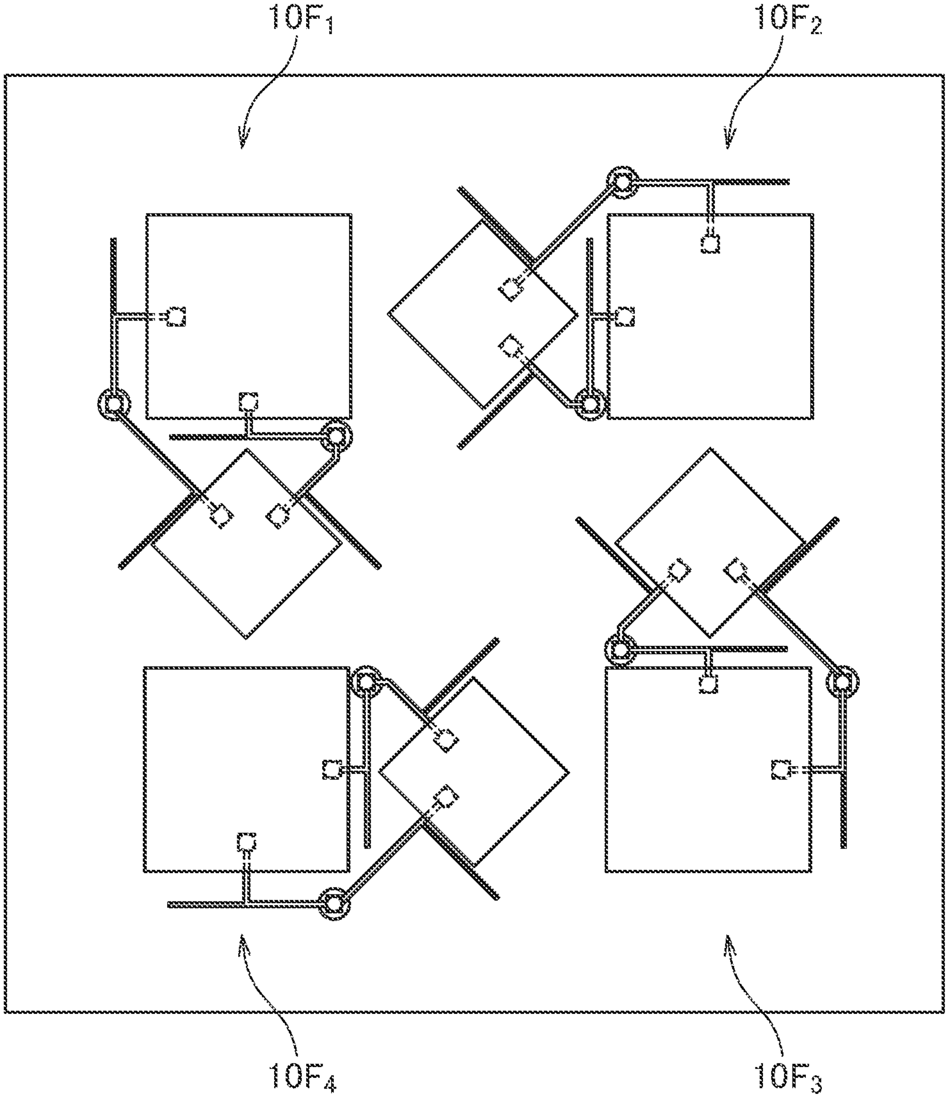
FIG. 17 is a diagram illustrating a configuration in which plural dual band patch antennas according to the sixth embodiment of the present invention are arranged.

A plurality of the dual band patch antennas 10F according to the present embodiment may be arranged in a matrix as illustrated in FIG. 17. In the example of FIG. 17, a dual band patch antenna 10$F_2$ is rotated clockwise by 90° with respect to a dual band patch antenna 10$F_1$, a dual band patch antenna 10$F_3$ is rotated clockwise by 180° with respect to the dual band patch antenna 10$F_1$, and a dual band patch antenna 10$F_4$ is rotated clockwise by 270° with respect to the dual band patch antenna 10$F_1$. As a result, the oscillating direction of the first radiation conductor 31 included in the dual band patch antennas 10$F_1$ to 10$F_4$ differs by 45° from the oscillating direction of the second radiation conductor 32 included in the dual band patch antennas 10$F_1$ to 10$F_4$, so that mutual interference is less likely to occur even when the phased array antenna is constituted.

It is apparent that the present invention is not limited to the above embodiments, but may be modified and changed without departing from the scope and spirit of the invention.

For example, while the dual band patch antenna having two radiation conductors has been described in the above embodiments, by providing three or more radiation conductors, a triple-band antenna or multi-band antenna can be constructed.

What is claimed is:

1. An antenna comprising:

first and second radiation conductors;

a first conductor electrically coupled to the first radiation conductor, wherein at least part of the first conductor overlaps with the first radiation conductor in plan view; and a second conductor electrically coupled to the second radiation conductor, wherein at least part of the second conductor overlaps with the second radiation conductor in plan view, wherein the first and second radiation conductors each include a first side extending in a first direction and a second side extending in a second direction perpendicular to the first direction, and wherein the first and second radiation conductors overlap each other in neither the first nor second direction in a plan view such that a first arrangement range of the first radiation conductor in the first direction does not overlap the second radiation conductor in a plan view and that a second arrangement range of the second radiation conductor in the second direction does not overlap the first radiation conductor in a plan view.

2. The antenna as claimed in claim 1, further comprising:

a first open stub having one end connected to the first conductor and other end opened; and a second open stub having one end connected to the second conductor and other end opened.

3. The antenna as claimed in claim 2, wherein the first open stub overlaps with the first radiation conductor, and wherein the second open stub overlaps with the second radiation conductor.

4. The antenna as claimed in claim 1, further comprising:

a third conductor disposed so as to overlap the first radiation conductor; and a fourth conductor disposed so as to overlap the second radiation conductor.

5. The antenna as claimed in claim 4, wherein the third and fourth conductors each include a third side extending in the first direction and a fourth side extending in the second direction, and wherein the third and fourth conductors overlap each other in neither the first nor second direction in a plan view.

6. The antenna as claimed in claim 1, wherein the first radiation conductor is positioned on a first conductor layer, and wherein the part of the first conductor is positioned on a second conductor layer different from the first conductor layer.

7. The antenna as claimed in claim 6, wherein the second radiation conductor is positioned on the first conductor layer, and wherein the part of the second conductor is positioned on the second conductor layer.

8. The antenna as claimed in claim 1, wherein the first conductor includes a first vertical feeding conductor having one end electrically coupled to a predetermined planar position of the first radiation conductor and a first horizontal feeding conductor connected to other end of the first vertical feeding conductor, and wherein the second conductor includes a second vertical feeding conductor having one end electrically coupled to a predetermined planar position of the second radiation conductor and a second horizontal feeding conductor connected to other end of the second vertical feeding conductor.

9. An antenna comprising:

a plurality of radiation conductors including a first radiation conductor and a second radiation conductor closest to the first radiating conductor in a same plane;

a first conductor electrically coupled to the first radiation conductor; and a second conductor electrically coupled to the second radiation conductor, wherein the first and second radiation conductors each include a first side extending in a first direction and a second side extending in a second direction perpendicular to the first direction, and wherein the first and second radiation conductors overlap each other in neither the first nor second direction in a plan view such that a first arrangement range of the first radiation conductor in the first direction does not overlap the second radiation conductor in a plan view and that a second arrangement range of the second radiation conductor in the second direction does not overlap the first radiation conductor in a plan view.

10. The antenna as claimed in claim 9, wherein the first radiation conductor is positioned on a first conductor layer, and wherein the first radiation conductor overlap with any other radiation conductors positioned on the first conductor layer in neither the first nor second direction in a plan view.

11. The antenna as claimed in claim 10, wherein the second radiation conductor overlap with any other radiation conductors positioned on the first conductor layer in neither the first nor second direction in a plan view.

12. The antenna as claimed in claim 11, wherein at least a part of the first conductor overlaps with the first radiation conductor in plan view.

13. The antenna as claimed in claim 12, wherein at least a part of the second conductor overlaps with the second radiation conductor in plan view.

* * * * *